Sept. 26, 1933.  C. STEDLEY  1,928,576
ELECTRIC SELF FEEDING IRON
Filed Aug. 29, 1932
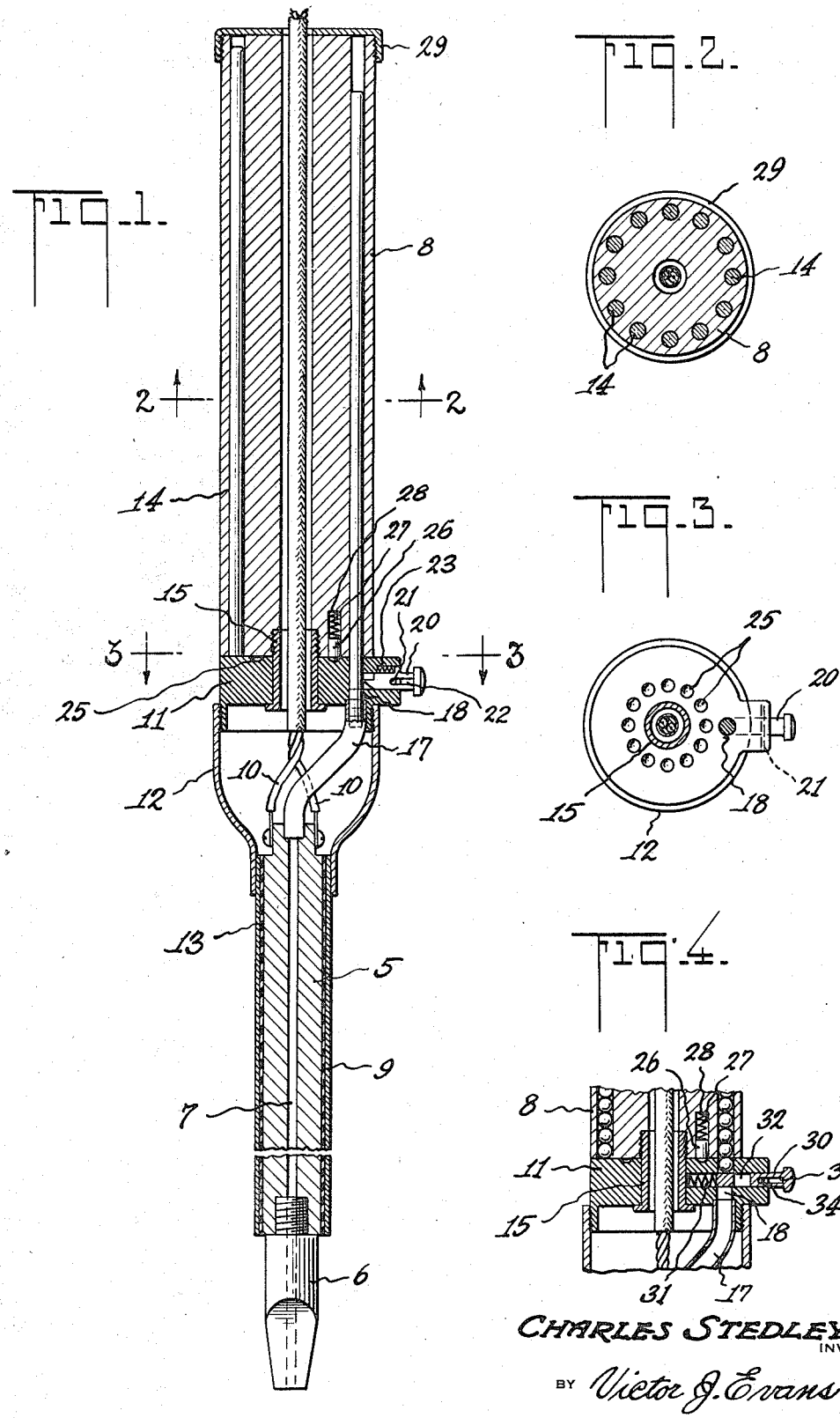
CHARLES STEDLEY
INVENTOR
BY Victor J. Evans & Co.
ATTORNEY Patented Sept. 26, 1933

1,928,576

UNITED STATES PATENT OFFICE 1,928,576

ELECTRIC SELF-FEEDING IRON

Charles Stedley, Queens Village, N. Y.

Application August 29, 1932. Serial No. 630,925

6 Claims. (Cl. 219—27)

This invention relates to soldering irons and it has for one of its objects the provision of an electric soldering iron embodying a reservoir or loading chamber from which the solder may be fed, as desired, into the soldering iron where it is preferably melted by heat from an electrical resistance element.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is mainly a longitudinal section of one form of my invention.

Figs. 2 and 3 are, respectively, sections taken on lines 2—2 and 3—3 of Fig. 1; and Fig. 4 is a fragmentary longitudinal section of a modified form of my invention.

Referring to the drawing for a more detailed description thereof, and at first to Figs. 1 to 3, inclusive, the numeral 5 indicates the soldering iron proper, the iron herein shown having a removable soldering end 6. Said iron proper has a longitudinal bore 7 extending throughout its length, this bore being adapted to receive solder from a reservoir or loading chamber 8, which is connected with the iron and which is described in detail hereinafter. The solder received from the loading chamber or reservoir is adapted to be melted as it passes through the bore 7, an electrical resistance element 9 surrounding the greater part of said iron being provided for that purpose. It will readily be understood that the molten solder runs through the bore to the lower or soldering end of the iron, where it is used.

A pair of conductors 10, which are connected to the ends of the electrical resistance element 9, pass centrally up through the reservoir or barrel 8 and also through a member 11 which is held to the lower end of the barrel or loading chamber and is threadedly connected with a hollow member 12, the latter being secured to the upper end of a sheath or sleeve 13 which encircles the resistance element 9.

The barrel 8 has a plurality of circularly arranged longitudinal bores 14 extending completely therethrough, these bores being adapted to receive elongate pieces of solder, or, in other words, solder in wire form. Said barrel is rotatably held to the member 11 by means of a bushing 15 screw-threaded thereto, said bushing passing through the member 11 and having an annular peripheral frame contacting the bottom of said member.

Said barrel bores 14 being filled with solder in wire form, the barrel is turned until one of the bores of the barrel is in registration with a tube 17 which is secured at its lower end to the upper end of the iron and the interior of which communicates with the bore 7 of the iron, and which tube 17 is connected at its upper end to the member 11 which has an aperture 18 in alignment with the upper end of the bent tube 17 and in alignment also with the barrel bore from which the solder is to be used.

Means are provided for cutting the solder wire into pieces, said means being shown in the drawing as comprising a cutter 20 mounted on a pin 21 in the block or member 11 and provided with a slot 22 through which said pin passes. The member 20 is normally held in its outermost position by means of a coil spring 23. When it is desired to cut off a piece of solder the member 20 is pressed inwardly against the action of the spring and its sharp inner edge cuts the solder, the piece cut off falling through the tube 17 and then into the bore 7 of the soldering iron proper where it is melted due to the heat generated in the electrical resistance element, and, as stated above, falls to the lower end of the iron. After the solder wire in one bore of the barrel has been used, the latter is turned until the next barrel bore is in registration with the aperture 18 in the member 11 and with the tube 17. In order to hold the barrel in adjusted position, the upper surface of the member or block 11 is provided with the circularly arranged series of depressions 25, any one of which is adapted to receive a key 26 pressed downwardly by a coil spring 27, said key and spring being movable in a recess 28 formed in the lower end of the barrel. A screw cap 29 is secured to the upper end of the barrel to prevent the solder from falling out.

Referring now to Fig. 4 which shows a modified form of my invention, this view is similar to the corresponding portion of Fig. 1 and differs from it only in the member 30, this member being provided to hold in position the solder in the barrel 8 when the solder, as shown in Fig. 4, is in the form of spheres or, in other words, is in shot form. The member 30 is normally pressed outwardly by means of a spring 31, the plunger 30 in this position retaining the shot in the barrel. Said plunger has a vertical aperture 32 of somewhat larger diameter than the shot so that when pressed inwardly against the action of the spring 31, the aperture 32 is in registration with the aperture 18 of the member 11 to allow the shot to fall into the tube 17 and from there into the bore of the iron proper. Said plunger has a longitudinal elongate slot 33 permitting longitudinal movement relative to the pin 34 which projects through said slot and which is mounted in the member 11.

What is claimed is:

1. A device of the character described comprising a soldering iron having a longitudinal bore extending to the soldering end thereof, electrical means for heating said iron, a supply member connected with said iron and rotatable relative thereto, said member having a plurality of circularly arranged longitudinal bores adapted to receive solder and to be placed successively in communication with the bore in said iron so that pieces of solder may fall thereinto.

2. A device of the character described comprising a soldering iron having a longitudinal bore extending to the soldering end thereof, electrical means for heating said iron, a supply member connected with said iron and rotatable relative thereto, said member having a plurality of circularly arranged longitudinal bores adapted to receive solder and to be placed successively in communication with the bore in said iron so that pieces of solder may fall thereinto, and means for cutting the solder into pieces.

3. A device of the character described comprising a soldering iron having a longitudinal bore extending to the soldering end thereof, electrical means for heating said iron, a supply member connected with said iron and rotatable relative thereto, said member having a plurality of circularly arranged longitudinal bores adapted to receive solder and to be placed successively in communication with the bore in said iron so that pieces of solder may fall thereinto, and means movable to allow pieces of solder to pass into the bore of said iron.

4. A device of the character described comprising a soldering iron having a longitudinal bore extending to the soldering end thereof, electrical means for heating said iron, a supply member connected with said iron and rotatable relative thereto, said member having a plurality of circularly arranged longitudinal bores adapted to receive solder and to be placed successively in communication with the bore in said iron so that pieces of solder may fall thereinto, and releasable means for holding said iron and said rotatable member in a desired relative position.

5. A device of the character described comprising a soldering iron having a longitudinal bore extending to the soldering end thereof, electrical means for heating said iron, a supply member connected with said iron and rotatable relative thereto, said member having a plurality of longitudinal bores and adapted to be moved to effect registration of its bores successively with the bore in said iron.

6. A device of the character described comprising a soldering iron having a longitudinal bore extending to the soldering end thereof, electrical means for heating said iron, a supply member connected with said iron and rotatable relative thereto, said member having a plurality of longitudinal bores and adapted to be moved to effect registration of its bores successively with the bore in said iron, and means movable to allow pieces of solder to pass into the bore of said iron.

CHARLES STEDLEY.